(12) United States Patent
Bendahan et al.

(10) Patent No.: US 12,203,879 B2
(45) Date of Patent: Jan. 21, 2025

(54) PULSE FREQUENCY ADJUSTMENT

(71) Applicant: SMITHS DETECTION FRANCE S.A.S., Vitry-sur-Seine (FR)

(72) Inventors: Joseph Bendahan, San Jose, CA (US); Serge Maitrejean, Paris (FR)

(73) Assignee: Smiths Detection France S.A.S., Vitry-sur-Seine (FR)

( * ) Notice: Subject to any disclaimer, the term of this patent is extended or adjusted under 35 U.S.C. 154(b) by 271 days.

(21) Appl. No.: 17/996,596

(22) PCT Filed: Apr. 19, 2021

(86) PCT No.: PCT/GB2021/050938
§ 371 (c)(1),
(2) Date: Oct. 19, 2022

(87) PCT Pub. No.: WO2021/214442
PCT Pub. Date: Oct. 28, 2021

(65) Prior Publication Data
US 2023/0221266 A1     Jul. 13, 2023

(30) Foreign Application Priority Data
Apr. 20, 2020 (GB) .................................... 2005684

(51) Int. Cl.
*G01N 23/10* (2018.01)
*G01N 23/04* (2018.01)
*G01N 23/083* (2018.01)

(52) U.S. Cl.
CPC ............. *G01N 23/10* (2013.01); *G01N 23/04* (2013.01); *G01N 23/083* (2013.01)

(58) Field of Classification Search
CPC ...... G01N 23/10; G01N 23/04; G01N 23/083; G01V 5/22; G01V 5/232; G01T 1/24; G01T 1/2978
See application file for complete search history.

(56) References Cited

U.S. PATENT DOCUMENTS

2013/0136230 A1   5/2013   Arodzero
2015/0325401 A1   11/2015   Langeveld
(Continued)

FOREIGN PATENT DOCUMENTS

EP   3273277 A1   1/2018
EP   3364219 A2   8/2018
(Continued)

OTHER PUBLICATIONS

International Search Report and Written Opinion issued in International Patent Application No. PCT/GB2021/050938, mailed Jun. 28, 2021, 12 pages.
(Continued)

*Primary Examiner* — David P Porta
*Assistant Examiner* — Meenakshi S Sahu
(74) *Attorney, Agent, or Firm* — Armstrong Teasdale LLP

(57) ABSTRACT

In one example, there is provided a method for processing data associated with inspection of cargo with an inspection system, the inspection system including a radiation source configured to emit a plurality N of successive pulses irradiating the cargo at a frequency, and a matrix detector including a first column $p_1$ of detectors and at least one second column $p_2$ of detectors. The method includes obtaining data associated with a scanning of at least one part of the cargo with a current frequency $f_n$, wherein the scanning includes displacing the cargo and the system with a relative scanning displacement; determining a pace δ, at a predetermined instant t; and determining whether the determined pace δ is reliable. If the pace is reliable, the current frequency is updated.

20 Claims, 9 Drawing Sheets

(56) References Cited

U.S. PATENT DOCUMENTS

2015/0338545 A1    11/2015  Arodzero
2017/0023698 A1*  1/2017  Morton .................. G01V 5/232

FOREIGN PATENT DOCUMENTS

| EP | 3364219 A3 | 1/2019 |
|---|---|---|
| GB | 2592607 A | 9/2021 |
| WO | 2009027667 A2 | 3/2009 |

OTHER PUBLICATIONS

Search Report issued in GB Patent Application No. 2005684.2, dated Oct. 20, 2020, 3 pages.

* cited by examiner

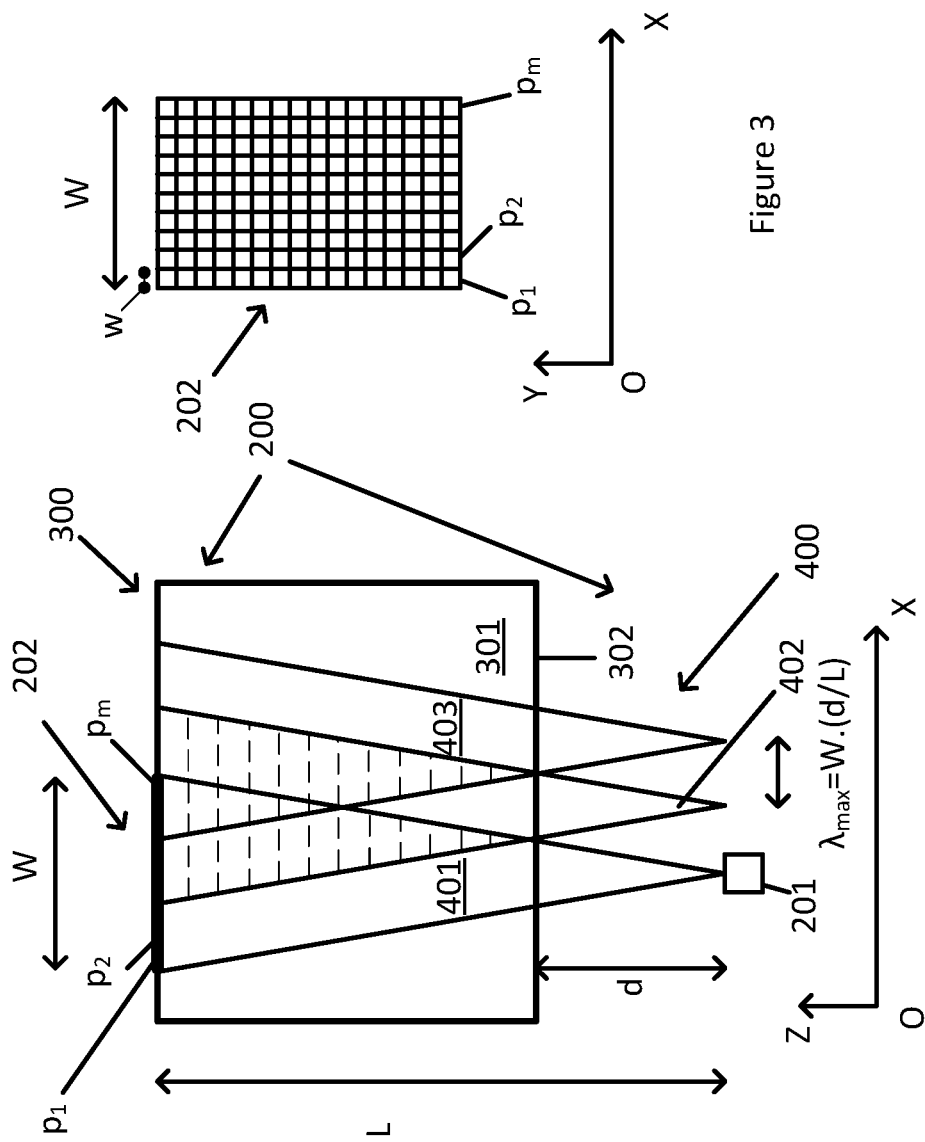

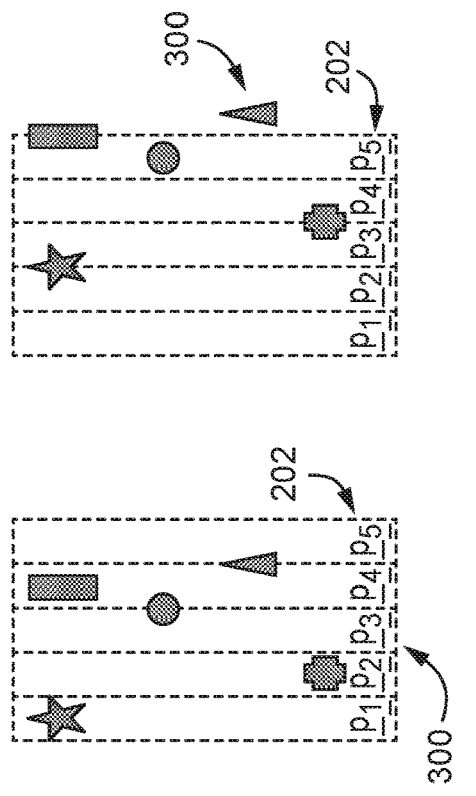
Figure 6A Pulse $t_1$
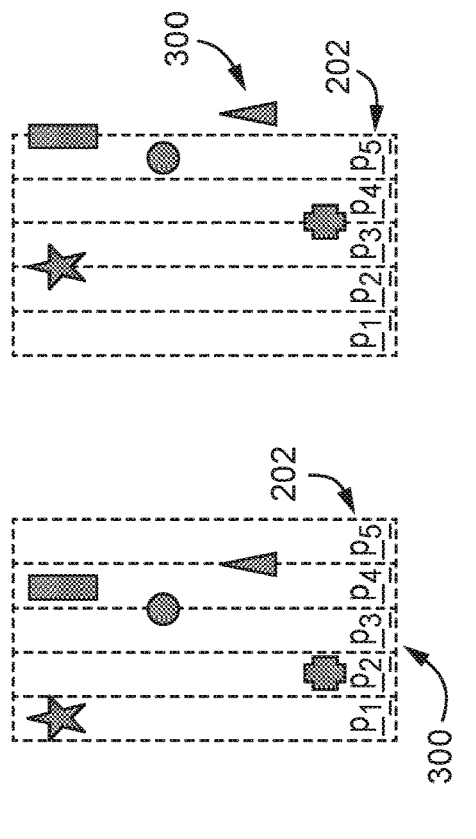
Figure 6B Pulse $t_2$
Relative Movement of the Matrix Detector
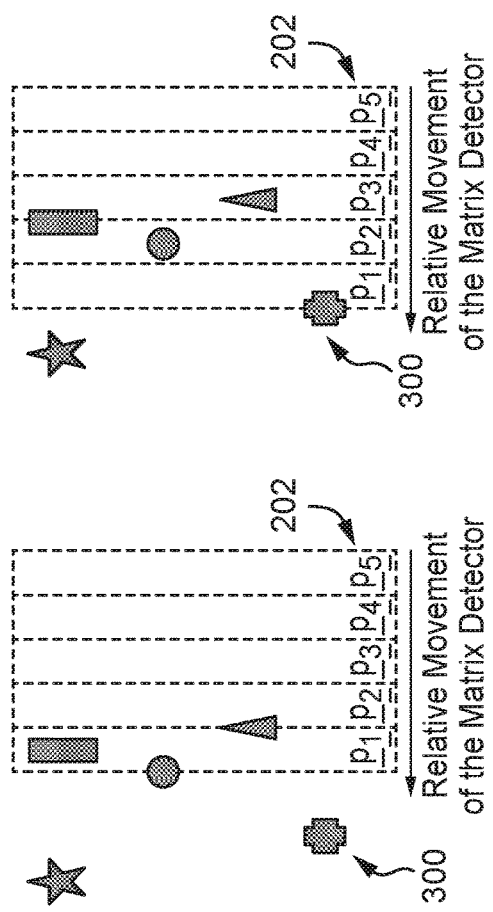
Figure 6C Pulse $t_3$
Figure 6D Pulse $t_4$
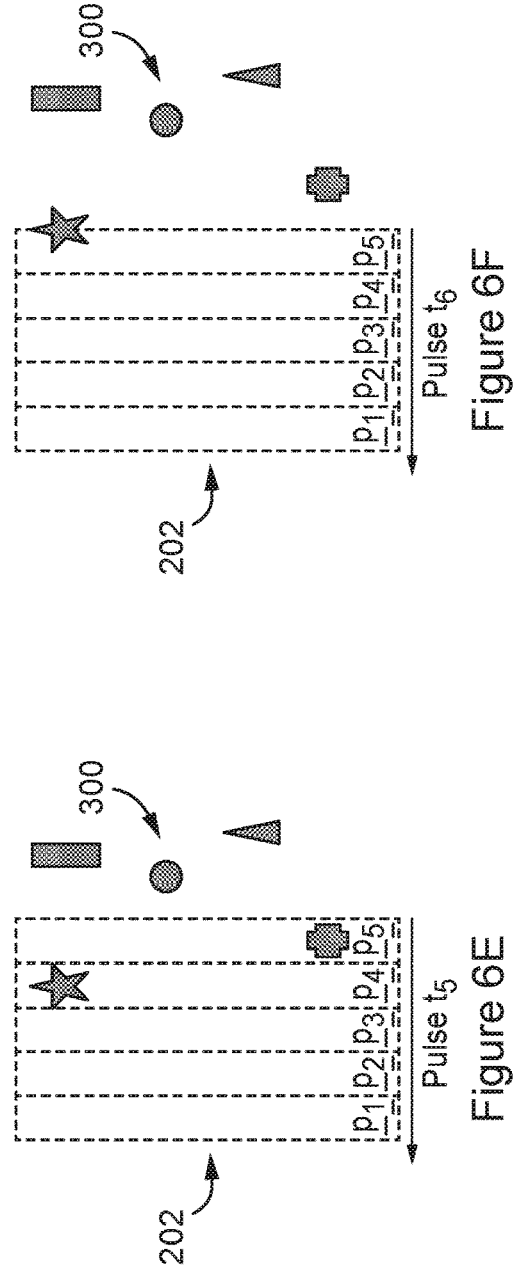
Figure 6E Pulse $t_5$
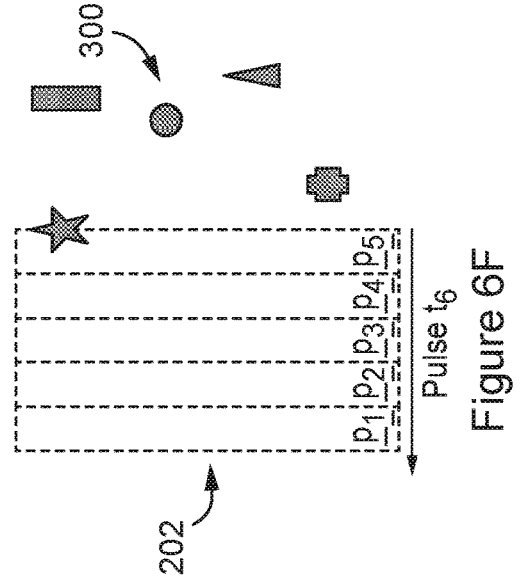
Figure 6F Pulse $t_6$

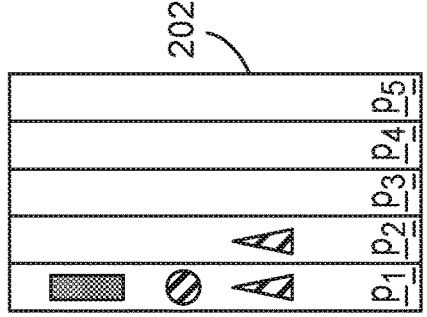
Figure 7A Pulse $t_1$
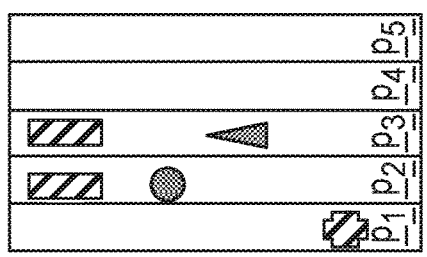
Figure 7B Pulse $t_2$
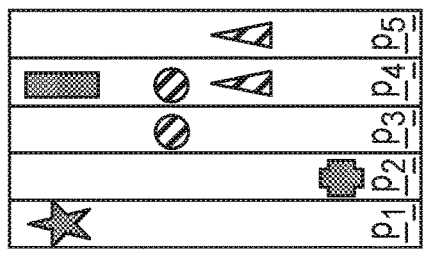
Figure 7C Pulse $t_3$
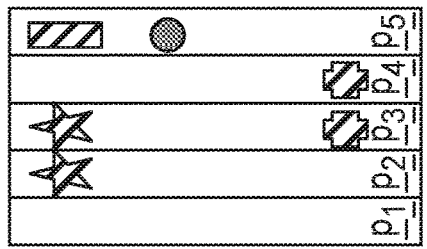
Figure 7D Pulse $t_4$
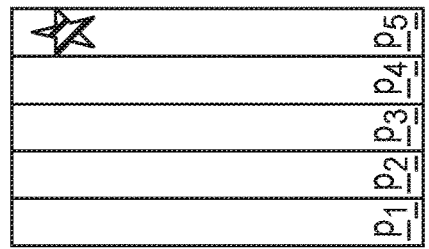
Figure 7E Pulse $t_5$
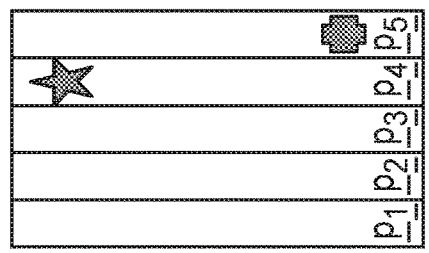
Figure 7F Pulse $t_6$

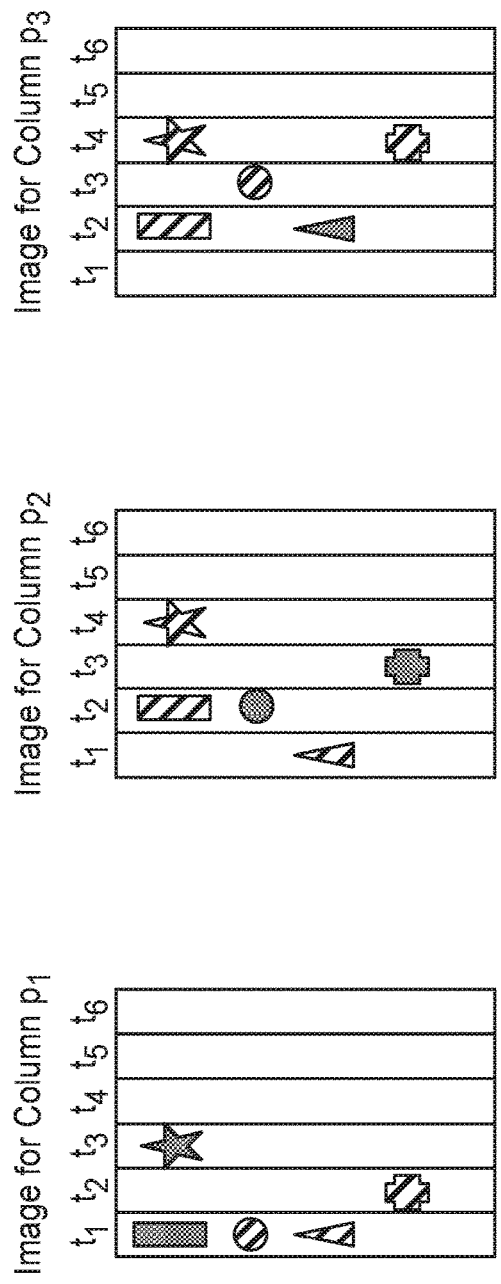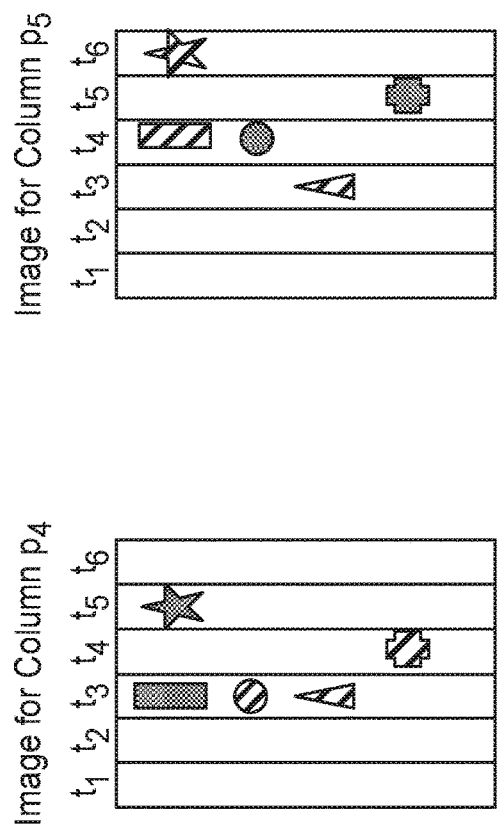
Figure 8A
Figure 8B
Figure 8C
Figure 8D
Figure 8E

PULSE FREQUENCY ADJUSTMENT

CROSS-REFERENCE TO RELATED APPLICATIONS

This application is a national stage application of PCT/GB2021/050938 filed on Apr. 19, 2021, which claims priority to GB Application No. 2005684.2 filed on Apr. 20, 2020, the disclosures of which are hereby incorporated by reference herein in their entirety as part of the present application.

FIELD OF DISCLOSURE

The disclosure relates but is not limited to methods for processing data associated with inspection of cargo with an inspection system. The disclosure also relates to associated controllers and computer programs or computer program products.

BACKGROUND

Radiography employs a source of radiation placed on one of side of the object to be scanned and the detectors on the opposite side. The radiography is produced by measuring the radiation transmitted through the object and impinging on the detectors. The projection of the beam unto the object expands from narrow at the source to wide at the detectors. The radiation is collimated to just cover the detectors to reduce the measured scattered radiation and the dose footprint.

Typically, high-energy x-ray scanners use pulsed x-ray sources. The maximum pulsing frequency of commercially available linacs (2019) range from 400 to 1000 Hz. Most sources are dual-energy to enable atomic-number discrimination.

To scan an object, for example a truck, there is a relative motion between the source-detectors and the truck. In portal or train scanner applications, the cargo moves while the source and detectors are fixed.

Unlike continuous sources, pulsed sources produce a snapshot of the collimated radiation impinging on the object and transmitted to the detectors.

In some examples, the relative speed may vary from a nominal scanning speed, for example for a truck driven through a portal x-ray scanner or railcars through a train scanner. If the relative speed is too high compared to the nominal scanning speed, parts of the object may not be irradiated. If the relative speed is too low compared to the nominal scanning speed, parts of the object may be irradiated multiple times, and the dose to cargo and to environment may increase. Due to the divergence of the beam, lack of proper irradiation coverage may be greater near the source, and overlap may be greater near the detectors.

Some inspection systems use an external speed sensor to determine the relative speed.

SUMMARY

Aspects and embodiments of the disclosure are set out in the appended claims. These and other aspects and embodiments of the disclosure are also described herein.

BRIEF DESCRIPTION OF DRAWINGS

Embodiments of the present disclosure will now be described, by way of example, with reference to the accompanying drawings, in which:

FIG. 2 schematically represents an example inspection system for inspecting cargo according to the disclosure;

FIG. 3 schematically represents an example matrix detector according to the disclosure;

FIGS. 6A to 6F schematically represent a relative movement between five objects of the cargo and the matrix detector including five columns, for six pulses;

FIGS. 7A to 7F schematically represent the measurements corresponding to the pulses of FIGS. 6A to 6F, respectively, on the matrix detector;

FIGS. 8A to 8E schematically represent the images for each column of the matrix detector, for the six pulses of FIGS. 7A to 7F;

In the figures, similar elements bear identical numerical references.

DETAILED DESCRIPTION

Overview

Embodiments of the disclosure provide a method for inspecting cargo with an inspection system. The inspection may include a radiation source configured to emit a plurality N of successive pulses at a current frequency $f_n$. The inspection system may also include a matrix of detectors including a plurality of columns of detectors. The method may include obtaining inspection data generated at the current frequency $f_n$. Images may be generated using the obtained inspection data, for at least some of the columns of detectors of the matrix. The same area of the cargo may be imaged by several columns but at different instants. A pace δ between the generated images may be determined based on the delay between two successive columns. The frequency of the radiation source may be updated based on the generated pace δ, such that the scanning may be performed with the updated frequency.

Embodiments of the claimed disclosure enable obtaining an optimized quality of the image by maintaining the inspection dose by controlling the frequency of the radiation source, regardless of the relative speed between the cargo and the inspection system.

Alternatively or additionally, embodiments of the claimed disclosure enable obtaining an inspection of the full cargo by controlling the frequency of the radiation source, even in cases when the relative speed between the cargo and the inspection system may vary from a nominal scanning speed.

Alternatively or additionally, embodiments of the claimed disclosure enable an update of the frequency of the radiation source to be made without the need to obtain the relative speed between the cargo and the inspection system. Alternatively or additionally, embodiments of the claimed disclosure enable to update the frequency of the radiation source based on the pace δ instead of an obtained relative speed between the cargo and the inspection system.

Alternatively or additionally, in embodiments of the claimed disclosure, the frequency adjustment is performed using data from an actual scanning of the cargo and takes into account the depth of the cargo—which is not the case when using an external speed sensor. Alternatively or additionally, in embodiments of the claimed disclosure, the frequency adjustment may enable obtaining less distorted, better quality inspection images compared to cases using an external speed sensor.

Alternatively or additionally, embodiments of the claimed disclosure enable to update the frequency of the radiation source to a greater frequency when needed, such that all of the parts of the cargo are irradiated. Alternatively or additionally, embodiments of the claimed disclosure enable to update the frequency of the radiation source to a lower frequency when needed, such that the parts of the cargo which are irradiated multiple times are substantially minimised, e.g. substantially minimised to parts near the matrix detector.

DETAILED DESCRIPTION OF EXAMPLE EMBODIMENTS

Figure 1:
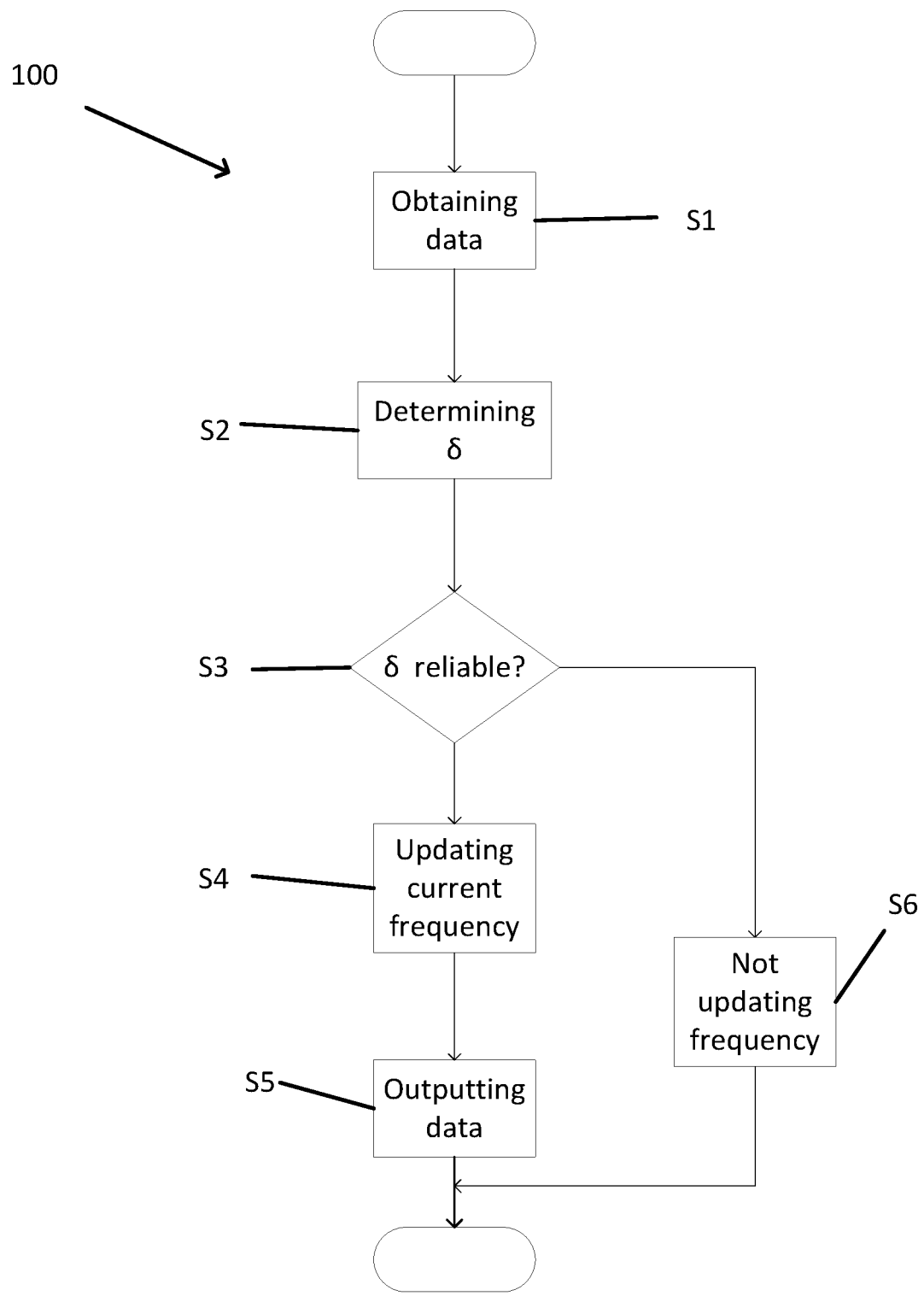
FIG. 1 schematically represents a flow chart illustrating an example method according to the disclosure.

FIG. 1 schematically represents a flow chart illustrating an example method 100 according to the disclosure. FIG. 2 schematically represents an example inspection system 200 for inspecting cargo 300 according to the disclosure.

In the example of FIG. 2, the inspection system 200 includes a radiation source 201 configured to emit a plurality N of successive pulses 400 irradiating the cargo 300 at a frequency f. The inspection system 200 also includes a matrix detector 202 including a first column p1 of detectors and at least one second column p2 of detectors.

Inspection of the cargo 300 by the inspection system 200 involves scanning the cargo 300. As illustrated in FIG. 2, the scanning includes displacing the cargo 300 and the system 200 with a relative scanning displacement along a scanning direction (OX). For clarity, in the example of FIG. 2, the cargo 300 is shown static with respect to the ground and the system 200 is shown as moving to the right of the figure along the direction (OX), for three pulses 400 (referred to as pulses 401, 402 and 403). It should be understood that the system 200 may be static with respect to the ground and the cargo 300 may move to the left of the figure along the direction (OX) during the scan.

The matrix detector 202 is also schematically represented in FIG. 3. In the examples of FIGS. 2 and 3, the matrix detector 202 has a total width W in the scanning direction (OX) and includes ten columns $p_1, p_2, \ldots, p_m$ with m=10 extending perpendicular to the scanning direction (OX), i.e. along direction (OY). Other values of m may be envisaged, and it should be understood that the developments of the disclosure would also apply to a matrix detector including two columns of detectors only (i.e. m=2), or any number of columns m such that m>2. If w is a width of each column $p_i$ (i=1 ... m), W the total width of the matrix detector 202 is such that:

$$W = mw$$

Due to the relative movement between the cargo 300 and the inspection system 200 during inspection, as shown in FIG. 2, the system 200 travels a distance $\lambda$ along the scanning direction (OX) between two pulses 400 emitted by the radiation source 201. In some cases, i.e. for a specific frequency corresponding to a given relative speed, the travelled distance may be a distance $\lambda_{max}$ such that:

$$\lambda_{max} = W \cdot \frac{d}{L}$$

with W is the total width W in the scanning direction of the matrix detector 202 having m columns, d is a distance between the radiation source 201 and a first plane 302 of the cargo 300 with respect to the radiation source 201, and L is a distance between the radiation source 201 and the matrix detector 202.

In FIG. 2, the distance $\lambda_{max}$ between two pulses (i.e. a time period in pulses) may correspond to a desired case where the specific frequency of the radiation source 201 and the given relative speed are such that all of the parts of the cargo 300 are irradiated by the pulses 401, 402 and 403, and such that the parts of the cargo which are irradiated multiple times (i.e. because of the overlap of the pulses 401, 402 and 403—see hashed areas in FIG. 2) are substantially minimised, e.g. substantially minimised to parts near the matrix detector 202. The distance $\lambda_{max}$ by which the system 200 travels between two pulses (i.e. a time period in pulses) may be associated with a pace $\delta_{min}$ (in number of pulses per column) corresponding to a number of pulses 400 for the system 200 to travel by a distance $\lambda'_{max}$ (in number of columns), such that:

$$\delta_{min} = \frac{1}{\lambda'_{max}}$$

with $$\lambda'_{max} = \frac{\lambda_{max}}{w}.$$

The pace $\delta_{min}$ has dimensions of pulses per column, i.e. a period of time per a distance (i.e. inverse of a speed).

The distance $\lambda_{max}$ and the pace $\delta_{min}$ of FIG. 2 are examples only and other examples of distances $\lambda$ and paces $\delta$ are envisaged.

Referring back to FIG. 1, the method 100 includes obtaining, at S1, data associated with a scanning of at least one part 301 of the cargo 300 with a current frequency $f_n$ and determining, at S2, a pace $\delta$, at a predetermined instant t. The step S2 will be described in more detail further down in the disclosure.

The method 100 also includes:
determining, at S3, whether the determined pace $\delta$ is reliable;
if it is determined at S3 that the pace $\delta$ is reliable, updating, at S4, the current frequency $f_n$ to an updated frequency $f_{n+1}$, such that:

$$f_{n+1} = F\left(\frac{\delta_0}{\delta}\right) f_n$$

where F(X) is an increasing function of X such that F(1)=1, and
$\delta_0$ is a predetermined pace; and
outputting, at S5, data to cause the scanning to be performed with the updated frequency being the current frequency.

In some examples, the function F(X) may be equal to X and the updated frequency $f_{n+1}$ may be such that:

$$f_{n+1} = \frac{\delta_0}{\delta} f_n$$

In some examples, $\delta_0$ may be $\delta_{min}$ described above.

Referring back to FIG. 1, the method 100 include outputting, at S5, data to cause the scanning to be performed with the updated frequency being the current frequency. The output data may include command data to trigger the radiation source 201 at the updated frequency.

Figure 4:
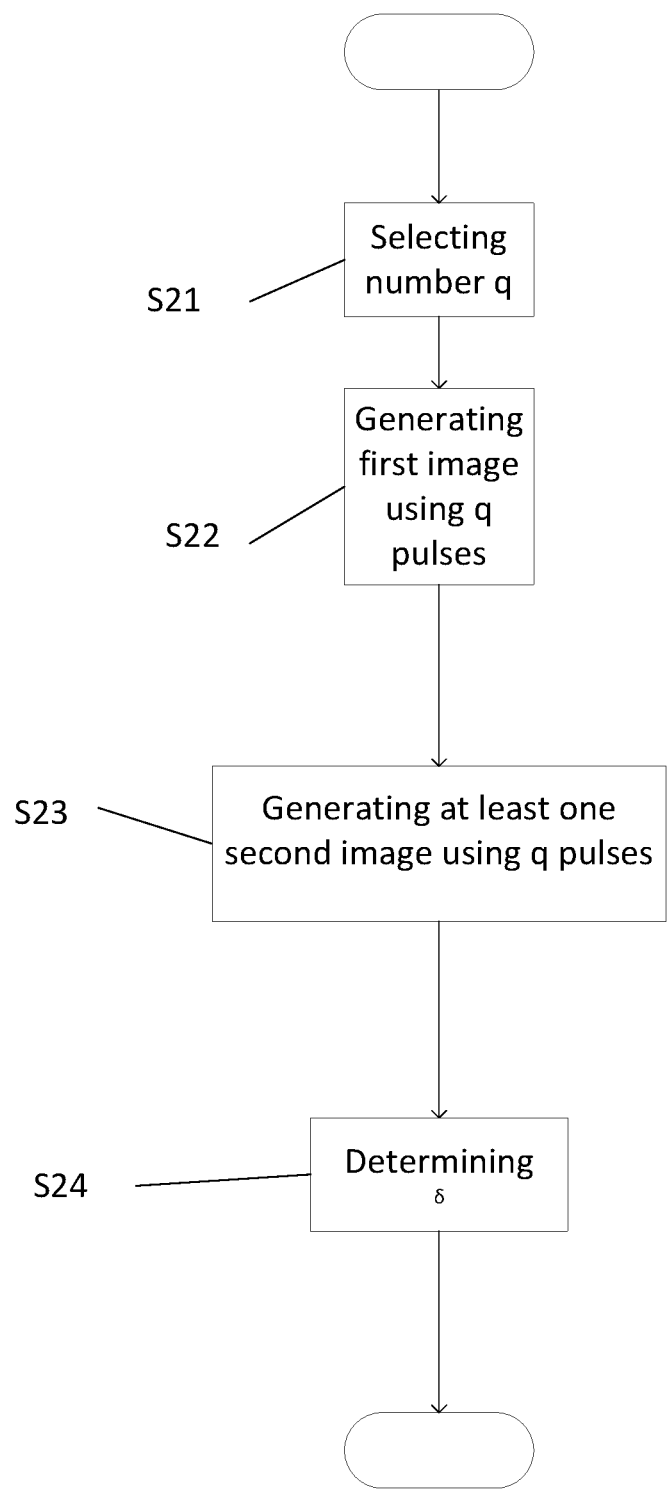
FIG. 4 schematically represents a flow chart illustrating an example method for determining a pace δ at a predetermined instant t, according to the disclosure.

FIG. 4 schematically represents a flow chart illustrating an example method S2 for determining the pace $\delta$ at the predetermined instant t.

In FIG. 4, determining at S2 the pace $\delta$ at the predetermined instant t, includes:
  selecting, at S21, a number q;
  generating, at S22, using the data obtained at S1, a first image of the cargo for the first column p1 of the matrix detector 202 using the q successive pulses emitted prior to the predetermined instant t;
  generating, at S23, using the data obtained at S1, at least one second image of the cargo for the at least one second column p2 of the matrix detector 202 using the q successive pulses emitted prior to the predetermined instant t; and
  determining, at S24, at the predetermined instant t, the pace $\delta$ using the first image of the cargo, the at least one second image of the cargo at the predetermined instant t, and a number ($p_2-p_1$) corresponding to the number of columns between the first column $p_1$ and the at least one second column $p_2$.

Several ways of determining at S24 the pace $\delta$ are described in greater detail later in the disclosure.

Before describing the determining of the pace $\delta$ performed at S24, examples of pace $\delta$ are explained below.

Figure 5:
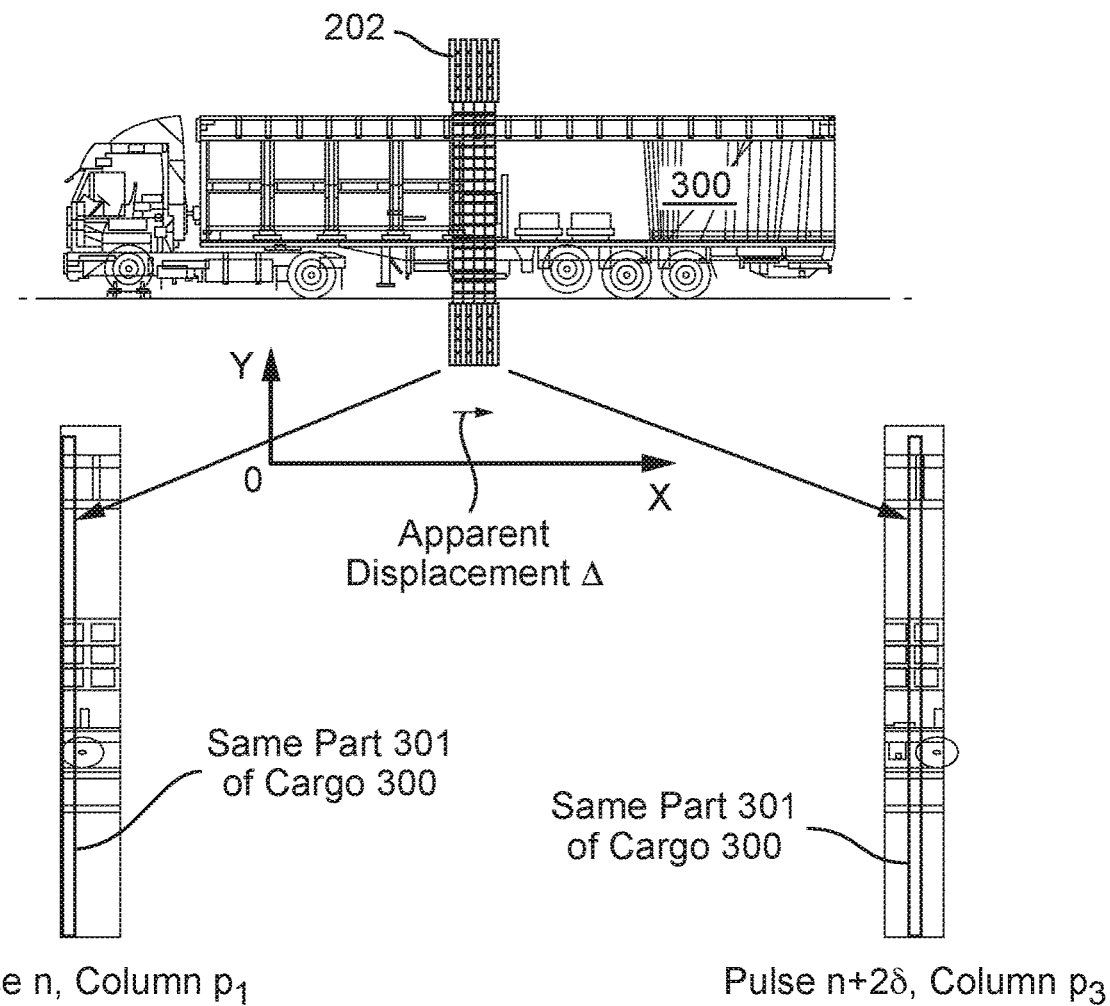
FIG. 5 schematically represents an apparent displacement Δ between the image of column $p_1$ and another column $p_3$.

The pace $\delta$ determined at S2 is associated with a number of pulses (the number not being necessary an integer) which is needed for the at least one part of the cargo 300 to apparently pass from one column $p_k$ of the matrix detector 202 to the next column $p_{k+1}$ in the matrix detector 202. As illustrated in FIG. 5, an apparent displacement (in number of pulses) in the scanning direction $\Delta$ between the image of column $p_k$ and another column $p_l$ is such that:

$$\Delta = (p_l - p_k)\delta$$

with l being equal to 3 and k being equal to 1 in the example of FIG. 5.

The pace $\delta$ is explained in greater detail with reference to FIGS. 6A to 8E.

FIGS. 6A to 6F schematically represent a relative movement of five objects of the cargo 300 with respect to the matrix detector 202 including five columns $p_1, p_2, p_3, p_4$ and $p_5$, for six pulses $t_1, t_2, t_3, t_4, t_5$, and $t_6$ (corresponding to selecting q=6 at S21). Other values of q≥2 may be envisaged. In some examples, the selected number q may be such that:

$$2 \leq q \leq 200.$$

FIGS. 7A to 7F schematically represent the measurements corresponding to FIGS. 6A to 6C, respectively, on the matrix detector 202. In FIGS. 7A to 7F solid objects in a column show that the corresponding objects are totally contained in the column, and hashed objects show that the corresponding objects overlap two columns. The hashed objects correspond to the situation where the objects appear on the two columns but with a lower contrast—for example on pulse $t_1$ the triangular object being between column $p_1$ and $p_2$ will generate a signal on column $p_1$ and $p_2$.

FIGS. 8A to 8E schematically represent the images for each column of the matrix detector, for the six pulses of FIGS. 7A to 7F (i.e. q=6). It will be appreciated that the image generated by column $p_4$ is the same image as the image generated by column $p_1$ with a time shift of two pulses (e.g. $t_3-t_1$). Similarly, the image generated by column $p_5$ is also the same image as the image of column $p_2$ with a time shift of two pulses (e.g. $t_5-t_3$). d is therefore of two pulses ($t_3-t_1$ or $t_5-t_3$) for three columns ($p_4-p_1$ or $p_5-p_2$), and dis such that:

$$\delta = \frac{2}{3}$$

As explained in greater detail below, the determined pace $\delta$ may be compared with a predetermined pace $\delta_0$.

If $\delta$ is smaller than $\delta_0$ (for example it takes $\delta$=two pulses for the image to apparently travel one column instead of $\delta_0$=5 pulses) the frequency of the radiation source is too low for the relative speed of the scan and needs to be increased. If $\delta$ is greater than $\delta_0$ (for example it takes $\delta$=seven pulses for the image to apparently travel one column instead of $\delta_0$=5 pulses) the frequency of the radiation source is too high for the relative speed of the scan and needs to be decreased.

In the example above $\delta_0$ may be equal to 5, but other values are envisaged. In some examples, the predetermined pace $\delta_0$ may be such that:

$$\frac{L}{m.d} < \delta_0 \leq q$$

where d is a distance between the radiation source 201 and a first plane 302 of the cargo with respect to the radiation source 201,
L is a distance between the radiation source 201 and the matrix detector 202,
m is a number of columns in the matrix detector 202 and q the selected number of successive pulses, and
q the number of successive pulses selected to generate the images.

The inequalities above will now be explained in more detail.

In the inequalities above, the ratio L/d takes into account the respective depth locations of the cargo and the matrix detector with respect to the radiation source. For simplicity, let the ratio L/d be equal to 1 (i.e. the cargo is located at the level of the matrix detector).

When $\delta$ is smaller than 1/m, it means that an object in the cargo has moved by more than m columns in one pulse. Therefore an object in the cargo can only be seen once and only on one single image (among the m images generated by the columns), which makes any estimation of $\delta$ impossible.

When $\delta$ is greater than q, in q pulses an object of the cargo will not have enough time to pass from one column of the matrix detector to the following column of the matrix detector. Therefore the object of the cargo will only appear on one image generated by the column, which also makes any estimation of $\delta$ impossible. Therefore if $\delta_0$ is greater than q, the selected number q must be increased.

In some examples, the first scanning of the at least one part 301 of the cargo is performed with a current frequency $f_n$ corresponding to a nominal maximum frequency $f_0$ of the radiation source. The nominal maximum frequency $f_0$ may be such that:

100 Hz≤$f_0$≤1000 Hz

Other values of $f_0$ are envisaged.

The update at S4 does not need to be done for each pulse, because the interval between two pulses is of the order of a few milliseconds, which is too short for a truck or a train to change its speed significantly. The predetermined instant t at which the pace δ is determined may be chosen at intervals ranging from intervals of 25 ms to intervals of 500 ms.

The determination of the pace δ performed at S24 will now be described in greater detail.

In some examples, determining at S24 the pace δ may include:
- determining a time shift $δ_t$ between the first image of the cargo and the at least one second image of the cargo at the predetermined instant t, using an image cross correlation technique; and
- dividing the determined time shift $δ_t$ by the number ($p_2$–$p_1$) corresponding to the number of columns between the first column $p_1$ and the at least one second column $p_2$.

In cases where determining at S24 the pace δ includes using an image cross correlation technique, the image cross correlation technique may be performed on a pair of generated images. In some examples, the pair of generated images may include the first image of the cargo for the first column $p_1$ of the matrix detector 202, and a second image of the cargo for a last column $p_m$ of the matrix detector.

Cross-correlation of images is known to the man skilled in the art for determining a displacement field in a sequence of images. An example of a cross-correlation technique will now be briefly described.

A Fourier transform may be used to find the displacement vector between the images, locally. If $I_{p_1}$ and $I_{p_m}$ are two images corresponding to columns $p_1$ and $p_m$, $F_{p_1}$ and $F_{p_m}$ are the 2D Fourier transforms.

A normalized cross power spectrum R may be calculated such that:

$$R = \frac{F_{p_m} \circ F_{p_1}^*}{|F_{p_m} \circ F_{p_1}^*|}$$

with ° is the entry-wise product and * is the complex conjugate.

If $I_{p_1}$ and $I_{p_m}$ are the same image shifted in the scanning direction (OX) by a time shift ($d_t$), the cross power spectrum is:

$$R(u) = \frac{F_{p_m} F_{p_1}^*}{|F_{p_m} F_{p_1}^*|}(u).e^{2i\pi(u.\delta_t)} = e^{2i\pi(u.\delta_t)}$$

In order to get the cross-correlation, the inverse Fourier transform of the cross power spectrum, which is now a Dirac delta function localized in ($d_t$), may be determined. Finding ($d_t$) may require calculation of R, and the maximum of the Fourier transform of R may be localized.

For determining a displacement field, the above method may be applied for each pixel (x,y) on a small square window (n×n pixels) centered on the pixel, and the result may be considered as the local displacement ($d_t$(x,y)).

The obtained time shift $d_t$ is divided by ($p_m$–$p_1$) to get the pace δ.

In some cases, determining at S24 the pace δ includes using an energy minimization technique, and energy minimization techniques are also known to the man skilled in the art. An example of an energy minimization technique will now be briefly described.

The energy minimization technique may be performed to minimize an energy function E(δ) such that:

$$E(\delta) = \sum_{p_1 \leq p_k < p_l \leq p_m} \sum_{i,j} \alpha(p_k, p_l) \times (I_{p_l}(i, j - (p_l - p_k)\delta) - I_{p_k}(i, j))^2$$

where $I_{p_k}$ is a first image of the cargo for a first column $p_k$ of the matrix detector, the image $I_{p_k}$ including pixels (i,j) in rows i and columns j, $I_{p_l}$ is a second image of the cargo for a second column $p_l$ of the matrix detector, the image $I_{p_l}$ including pixels (i,j) in rows i and columns j, $\alpha(p_k,p_l)$ a is a strictly positive weighting function of $p_k$ and $p_l$, and m is the number of columns in the matrix detector.

Referring back to FIG. 1, S3 includes determining whether the determined pace δ is reliable. In some cases, especially when the m images generated using the q pulses do not exhibit a large horizontal gradient (e.g. for local homogeneous content for example), the determined pace δ may not be reliable.

In some examples, determining at S3 whether the pace δ is reliable may include comparing a criterion C to a predetermined criterion threshold $C_{min}$ such that:

$$C = \sum_{k=1}^{m} \sum_{i,j} (I_k(i, j+1) - I_k(i, j))^2$$

with ($I_k$ (i, j+1)–$I_k$(i,j)) a horizontal gradient in image $I_k$ between columns j and (j+1).

S3 may also include determining that the pace δ is reliable when C is such that:

$C > C_{min}$

The value $C_{min}$ may be determined experimentally.

In cases where an energy minimization technique is used to determine the pace δ at S24, determining at S3 whether the pace δ is reliable may be performed using the energy function E and may include the steps of comparing the difference |$E_{min}$–E(0)| to a predetermined energy threshold $E_{threshold}$.

$E_{min}$ is the value of the energy E at the minimum such that E(d)=$E_{min}$, and E(0) is an initial value of the energy corresponding to no pace.

S3 may also include determining that the pace δ is reliable when |$E_{min}$–E(0)| is such that:

|$E_{min}$–E(0)|>$E_{threshold}$

The value $E_{threshold}$ may be determined experimentally.

Referring back to FIG. 1, if it is determined at S3 that the pace δ is not reliable, the method 100 includes, maintaining at S6 the frequency of the radiation source at the current frequency $f_n$. The frequency is not updated.

In some cases, the radiation source 201 may be configured to emit the pulses at a lower energy mode and a higher energy mode, e.g. to enable atomic-number discrimination.

In such cases, determining the pace δ at S2 may include:
  determining a pace $\delta_{LM}$ for the lower energy mode;
  determining a pace $\delta_{HM}$ for the higher energy mode; and
  determining the pace δ by using an experimentally-determined weighted average of the pace $\delta_{LM}$ for the lower energy mode and the pace δ BA for the higher energy mode.

Alternatively or additionally, determining the pace δ at S2 may include:
  processing the data obtained at S1 to further obtain data including data associated with the lower energy mode and data associated with the higher energy mode;
  converting the further obtained data associated with the lower energy mode into data corresponding to the higher energy mode; and
  determining the pace δ by using the converted data and the further obtained data associated with the higher energy mode.

In some examples, converting the further obtained data associated with the lower energy mode into data corresponding to the higher energy mode may include generating a histogram showing occurrences, in the inspection data, of pixels (i) with a given intensity associated with the higher energy mode data and (ii) with a given intensity associated with the lower energy mode data. The generated histogram may be used to associate each given intensity associated with the lower energy mode data to a corresponding most frequent intensity associated with the higher energy mode data. A transformation table mapping the associated intensities may be generated. The transformation table may be used to determine a transformed intensity corresponding to the higher energy mode data by transforming an intensity associated with the lower energy mode data.

An example of such method is also disclosed in GB2003046.6, incorporated herein in its entirety.

In cases including a lower energy mode and a higher energy mode, determining at S2 the pace δ may include generating the first image and the at least one second image using the 2q successive pulses emitted prior to the predetermined instant t. Alternatively or additionally, determining at S2 the pace δ may be performed at a periodicity which is halved compared to a periodicity in cases where the radiation source is configured to emit the pulses at a single energy mode.

As explained below, in some examples the determination of the pace δ may be performed by averaging, to obtain a smooth estimation.

In some examples determining at S2 the pace δ may be performed in several steps using a plurality K of instants prior to the predetermined instant t, and may include:
  selecting a current predetermined instant t;
  generating, using the obtained data, the first image of the cargo for the first column $p_1$ of the matrix detector using the q successive pulses emitted prior to the selected current predetermined instant t;
  generating, using the obtained data, the at least one second image of the cargo for the at least one second column $p_2$ of the matrix detector using the q successive pulses emitted prior to the selected current predetermined instant t;
  determining, at the current predetermined instant t, a current pace;
  determining whether the determined pace δ is reliable;
  if it is determined that the pace δ is reliable, storing the determined current pace δ at the current predetermined instant t;
  repeating, for the plurality K of instants:
    generating the first image and the at least one second image using the q successive pulses emitted prior to each of the plurality of current instants t,
    determining the current pace δ,
    determining whether the current pace δ is reliable, and
    storing the reliable pace δ.

The pace δ at the predetermined instant t may thus be determined by averaging the plurality of stored paces δ.

In some cases, the q pulses of an instant t may be overlapping the q pulses of an instant t−1.

In cases where the q pulses of an instant t are not overlapping the q pulses of an instant t−1, in order to limit the time between two frequency update the plurality K of instants may be such that:

$$2 \leq K \leq 10.$$

In some examples the method 100 may further include performing the scanning of the cargo. The method may be performed while the cargo is in a predetermined scanning zone.

Figure 9:
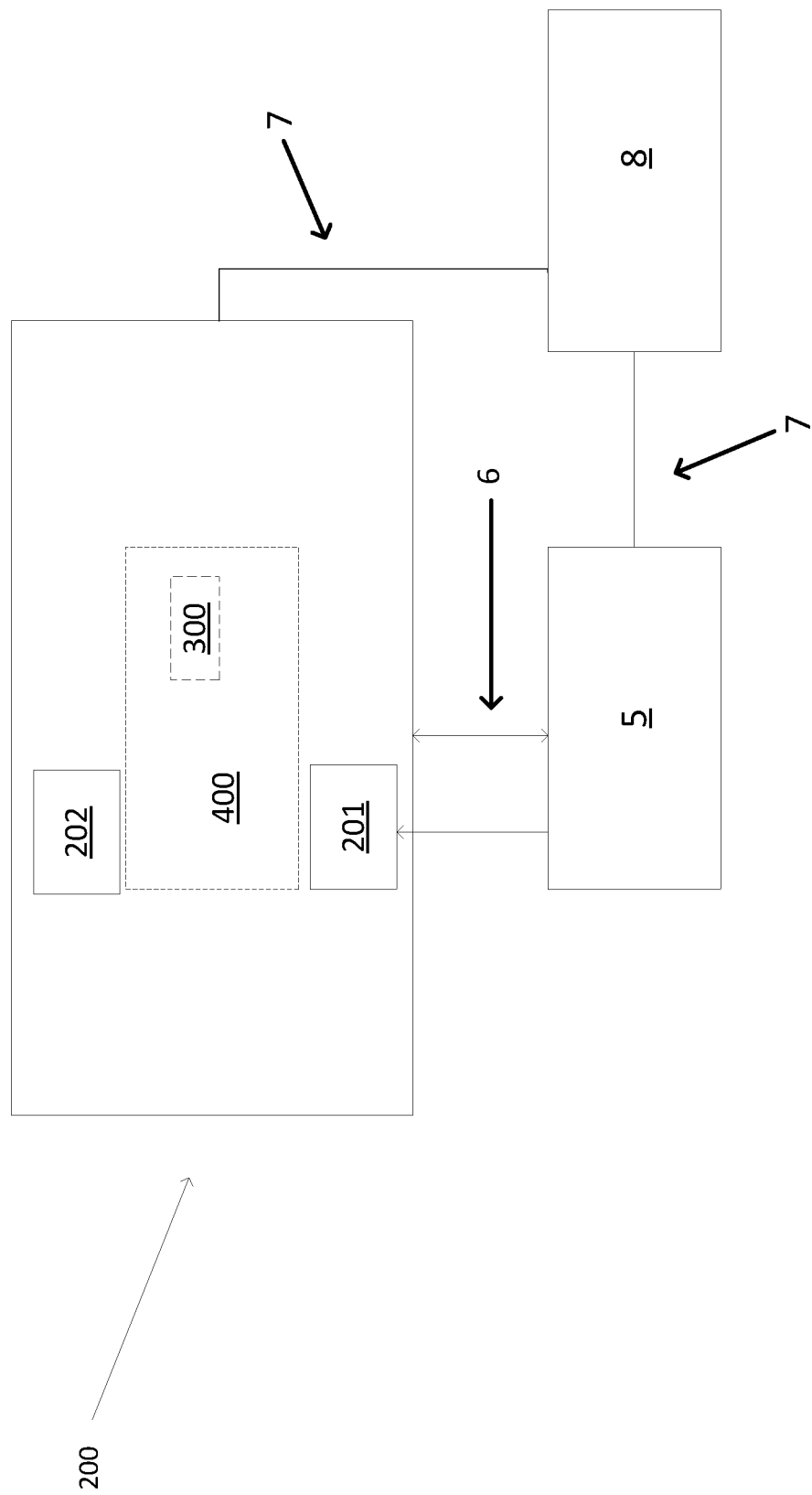
FIG. 9 illustrates an example inspection system including an example controller configured to perform, at least partly, a method according to any aspect of the disclosure.

FIG. 9 illustrates a controller 5 configured to perform, at least partly, a method 100 according to any aspects of the disclosure. The controller 5 is configured to cooperate with the inspection system 200 of any aspects of the disclosure.

In FIG. 9 the cargo 300 to be inspected is located in a container 400. The inspection system 200 of FIG. 9 may be configured to generate the inspection data according to any aspects of the disclosure.

The controller 5 may be configured to receive the inspection data, for example over a communication network 6 which may be wired and/or may be wireless.

As explained in greater detail below, the controller 5 conventionally includes at least a processor and a memory in order to carry out an example method according to the disclosure.

Figure 10:
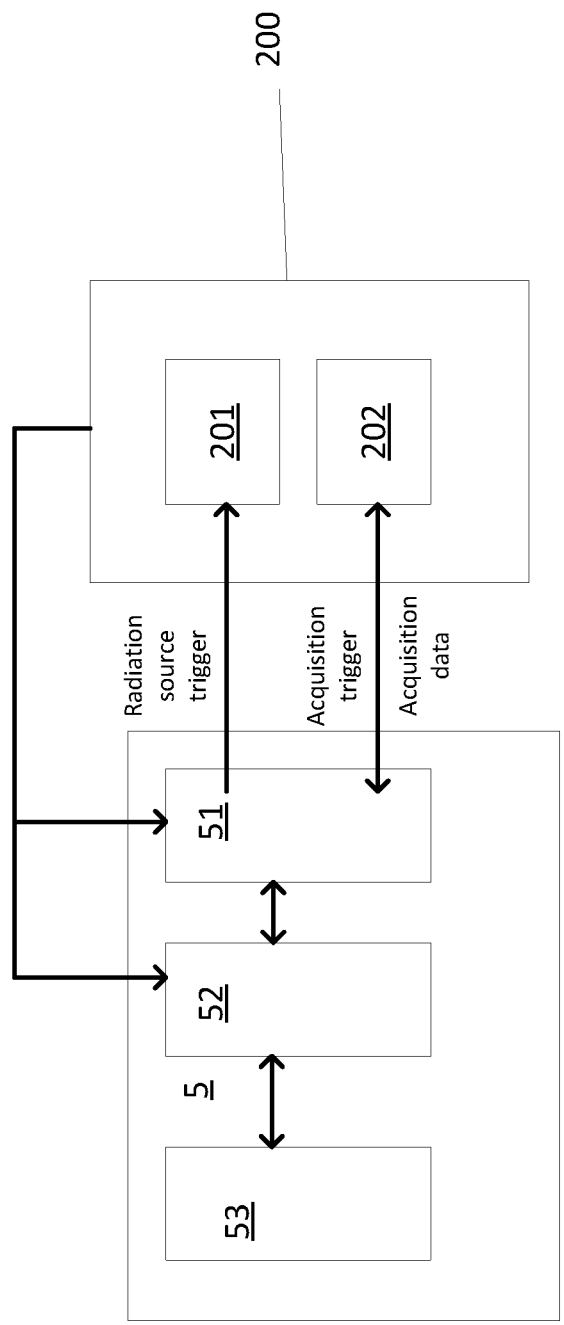
FIG. 10 schematically represents in more detail an example controller configured to cooperate with an inspection system.

As illustrated in FIG. 10, the controller 5 may include an interface board 51 configured to cooperate with the radiation source 201 and/or front end electronics of the matrix detector 202. The controller 5 may also include a processor 52 configured to pre-process the data associated with the scanning and/or generate the first image and the at least one second image of the present disclosure.

In some examples, the interface board 51 may be configured to, for each pulse of the plurality N of successive pulses:
  transfer the obtained data to the processor 52; and/or
  control acquisition of data by the front end electronics of the matrix detector 202, based on the current frequency $f_n$ of the radiation source 201; and/or
  control generation of the successive pulses by the radiation source 201, based on the current frequency $f_n$.

The frequency value may be sent by the processor 52 to the interface board 51 before the next acquisition of data by the front end electronics of the matrix detector 202.

Alternatively or additionally, the controller 5 further includes a memory 53 storing instructions which, when executed by the processor 52, enable the processor to perform the method according to any aspects of the disclosure.

Alternatively or additionally the processor 52 may further be configured to determine the pace δ and the frequency update in real-time or near real-time (in parallel with doing the pre-processing) and to transfer the frequency update to the interface board 51.

In some examples (not shown in the Figures) the processor may be remote from the interface board. In such cases, the interface board may be further configured to transfer data to the processor via an Ethernet-based communication link. This architecture may be used when the relative speed of the cargo does not change too fast (e.g. when the cargo is on a train for example).

In some examples (not shown in the Figures) the processor may include an on-board processor located on the interface board. In such cases the on-board processor may include a field-programmable gate array, FPGA. The on-board processor may be configured to calculate directly the frequency update. The update of the frequency may be performed through the triggers to the radiation source without communication lag. The processor may have enough memory to store temporarily the required data. This architecture may be used when the relative speed of the cargo may change rapidly.

In the example illustrated by FIG. 9, a communication server 8 may be configured to communicate, via a communication network 7 which may be wired and/or may be wireless, with the system 200 and/or the controller 5. In some examples, the communication server 8 may be configured to perform functions of a remote data management system. In some examples the server 8 may include a database. The database may be configured to store the inspection data and/or the further data of any aspects of the disclosure.

Similarly the controller 5 may be configured to store the inspection data and/or the further data of any aspects of the disclosure.

VARIATIONS AND MODIFICATIONS

It is understood that the inspection radiation source may include sources of other radiation, such as, as non-limiting examples, sources of ionizing radiation, for example gamma rays or neutrons.

As one possibility, there is provided a computer program, computer program product, or computer readable medium, including computer program instructions to cause a programmable computer to carry out any one or more of the methods described herein. In example implementations, at least some portions of the activities related to the controller 5 herein may be implemented in software. It is appreciated that software components of the present disclosure may, if desired, be implemented in ROM (read only memory) form. The software components may, generally, be implemented in hardware, if desired, using conventional techniques.

In some examples, components of the controller 5 and/or the communications networks 6 and/or 7 may use specialized applications and hardware.

As will be apparent to the skilled in the art, the server 8 and/or the controller 5 should not be understood as a single entity, but rather refers to a physical and/or virtual device including at least a processor and a memory, the memory may be implemented in one or more servers which can be located in a single location or can be remote from each other to form a distributed network (such as "server farms", e.g., using wired or wireless technology).

In some examples, one or more memory elements (e.g., the database and/or the memory of the processor) can store data used for the operations described herein. This includes the memory element being able to store software, logic, code, or processor instructions that are executed to carry out the activities described in the disclosure.

A processor can execute any type of instructions associated with the data to achieve the operations detailed herein in the disclosure. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

The communications network 6 and the communications network 7 may form only one network.

The data received by the controller 5 may be typically received over a range of possible communications networks 6 and/or 7 at least such as: a satellite based communications network; a cable based communications network; a telephony based communications network; a mobile-telephony based communications network; an Internet Protocol (IP) communications network; and/or a computer based communications network.

In some examples, the communications networks 6 and/or 7 and/or the controller 5 may include one or more networks. Networks may be provisioned in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network.

The inspection system 200 may be mobile and may be transported from a location to another location (the system may include an automotive vehicle). Alternatively or additionally, the inspection system may be static with respect to the ground and cannot be displaced.

The inspection radiation source may include an X-ray generator. The energy of the X-rays may be between 100 keV and 15 MeV, and the dose may be between 2 mGy and 20 Gy (Gray). For a mobile inspection system, the power of the X-ray source may be e.g., between 100 keV and 9.0 MeV, typically e.g., 2 MeV, 3.5 MeV, 4 MeV, or 6 MeV, for a steel penetration capacity e.g., between 40 mm to 400 mm, typically e.g., 300 mm (12 in). For a mobile inspection system, the dose may be e.g., between 20 mGy and 120 mGy. For a static inspection system, the power of the X-ray source may be e.g., between 4 MeV and 10 MeV, typically e.g., 9 MeV, for a steel penetration capacity e.g., between 300 mm to 450 mm, typically e.g., 410 mm (16.1 in). For a static inspection system, the dose may be 17 Gy.

The detectors may include, amongst other conventional electrical elements, radiation detection lines, such as X-ray detection lines. The detectors may further include other types of detectors, such as optional gamma and/or neutrons detectors, e.g., adapted to detect the presence of radioactive gamma and/or neutrons emitting materials within the container, e.g., simultaneously to the X-ray inspection. For a mobile inspection system, the detectors may also include an electro-hydraulic boom which can operate in a retracted position in a transport mode and in an inspection position. The boom may be operated by hydraulic activators (such as hydraulic cylinders). For a static inspection system, the detectors may also include a structure and/or gantry. The detection lines may be mounted on the boom or structure and/or gantry, facing the source on the other side of the container.

In order to inspect the container, the system may include a motion generation device so that the system may be displaced, the container being static (this mode is sometimes referred to as a 'scanning' mode). Alternatively or additionally, the motion generation device may cause the container to be displaced, the system being static with respect to the ground. In some embodiments, the throughput, i.e. the number of containers and/or images by unit of time, may be of 20 to 30 images/hour. Alternatively or additionally, in a 'pass-through' mode the system does not include a motion generation device and the container moves with respect to the system, the system being static with respect to the ground. In embodiments, the throughput in the pass-through mode may be higher than the throughput in the scanning mode, and may be for example of 50 to 200 images/hour, or even of 50 to a few thousands images/hour in the case of an inspection of a passing train (for example a throughput of more than 1000 images/hour).

The above embodiments are to be understood as illustrative examples, and further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

The invention claimed is:

1. A method for processing data associated with inspection of cargo with an inspection system,
the inspection system comprising:
a radiation source configured to emit a plurality N of successive pulses irradiating the cargo at a frequency, and
a matrix detector comprising a first column $p_1$ of detectors and at least one second column $p_2$ of detectors,
the method comprising:
obtaining data associated with a scanning of at least one part of the cargo with a current frequency $f_n$, wherein the scanning comprises displacing the cargo and the system with a relative scanning displacement;
determining a pace $\delta$, at a predetermined instant t, comprising:
selecting a number q,
generating, using the obtained data, a first image of the cargo for the first column $p_1$ of the matrix detector using the q successive pulses emitted prior to the predetermined instant t,
generating, using the obtained data, at least one second image of the cargo for the at least one second column $p_2$ of the matrix detector using the q successive pulses emitted prior to the predetermined instant t, and
determining, at the predetermined instant t, the pace $\delta$ using the first image of the cargo, the at least one second image of the cargo, and a number $(p_2-p_1)$ corresponding to the number of columns between the first column $p_1$ and the at least one second column $p_2$;
determining whether the determined pace $\delta$ is reliable;
if it is determined that the pace $\delta$ is reliable, updating the current frequency $f_n$ to an updated frequency $f_{n+1}$, such that:

$$f_{n+1} = F\left(\frac{\delta_0}{\delta}\right) f_n$$

where F(X) is an increasing function of X such that F(1)=1, and
$\delta_0$ is a predetermined pace; and
outputting data configured to cause the scanning to be performed with the updated frequency being the current frequency.

2. The method of claim 1, wherein the first scanning of the at least one part of the cargo is performed with a current frequency $f_n$ corresponding to a nominal maximum frequency $f_0$ of the radiation source.

3. The method of claim 1, wherein the function F(X) is equal to X.

4. The method of claim 1, wherein determining the pace $\delta$ comprises:
determining a time shift $\delta_t$ between the first image of the cargo and the at least one second image of the cargo at the predetermined instant t, using an image cross correlation technique; and
dividing the determined time shift $\delta_t$ by the number $(p_2-p_1)$ corresponding to the number of columns between the first column $p_1$ and the at least one second column $p_2$.

5. The method of claim 1, wherein the image cross correlation technique is performed on a pair of generated images, optionally wherein the pair of generated images comprises:
the first image of the cargo for the first column $p_1$ of the matrix detector; and
a second image of the cargo for the last column $p_m$ of the matrix detector.

6. The method of claim 1, wherein determining the pace $\delta$ comprises using an energy minimization technique, the energy minimization technique being performed to minimize an energy function E($\delta$) such that:

$$E(\delta) = \sum_{p_1 \leq p_k < p_l \leq p_m} \sum_{i,j} \alpha(p_k, p_l) \times \left(I_{p_l}(i, j - (p_l - p_k)\delta) - I_{p_k}(i, j)\right)^2$$

where $I_{p_k}$ is a first image of the cargo for a first column $p_k$ of the matrix detector, the image $I_{p_k}$ comprising pixels (i,j) in rows i and columns j,
$I_{p_l}$ is a second image of the cargo for a second column $p_l$ of the matrix detector, the image $I_{p_l}$ comprising pixels (i,j) in rows i and columns j,
$\alpha(p_k, p_l)$ a is a strictly positive weighting function of $p_k$ and $p_l$, and
m is the number of columns in the matrix detector.

7. The method of claim 1, wherein the predetermined pace $\delta_0$ is such that:

$$\frac{L}{m.d} < \delta_0 \leq q$$

where d is a distance between the radiation source and a first plane of the cargo with respect to the radiation source, L is a distance between the radiation source and the matrix detector, and m is the number of columns in the matrix detector and q the selected number of successive pulses.

8. The method of claim 1, wherein the selected number q is such that:

$$2 \leq q \leq 200.$$

9. The method of claim 1, comprising, if it is determined that the pace δ is not reliable:

maintaining the frequency at the current frequency $f_n$.

10. The method of claim 1, wherein determining whether the pace δ is reliable comprises:

comparing a criterion C to a predetermined criterion threshold $C_{min}$ such that:

$$C = \sum_{k=1}^{m} \sum_{i,j} (I_k(i, j+1) - I_k(i, j))^2$$

with $(I_k(i, j+1) - I_k(i,j))$ a horizontal gradient in image $I_k$ between columns j and (j+1); and determining that the pace δ is reliable when C is such that:

$$C > C_{min}$$

where the value of $C_{min}$ is determined experimentally.

11. The method of claim 6, wherein determining whether the pace δ is reliable is performed using the energy function E(δ) and comprises the steps of:

comparing the difference $|E_{min} - E(0)|$ to a predetermined energy threshold $E_{threshold}$; and determining that the pace δ is reliable when $|E_{min} - E(0)|$ is such that:

$$|E_{min} - E(0)| > E_{threshold}$$

where the value of $E_{threshold}$ is determined experimentally, $E_{min}$ is the value of the energy E at the minimum such that $E(d) = E_{min}$, and E(0) an initial value of the energy corresponding to no pace.

12. The method of claim 1, wherein the radiation source is configured to emit the pulses at a lower energy mode and a higher energy mode, and wherein determining the pace δ comprises:

determining a pace $\delta_{LM}$ for the lower energy mode;

determining a pace $\delta_{HM}$ for the higher energy mode; and determining the pace δ by using an experimentally-determined weighted average of the pace $\delta_{LM}$ for the lower energy mode and the pace $\delta_{HM}$ for the higher energy mode.

13. The method of claim 1, wherein the radiation source is configured to emit the pulses at a lower energy mode and a higher energy mode, and wherein determining the pace δ comprises:

processing the obtained data to further obtain data comprising data associated with the lower energy mode and data associated with the higher energy mode;

converting the further obtained data associated with the lower energy mode into data corresponding to the higher energy mode; and determining the pace δ by using the converted data and the further obtained data associated with the higher energy mode.

14. The method of claim 13, wherein:

determining the pace δ comprises generating the first image and the at least one second image using the 2q successive pulses emitted prior to the predetermined instant t; and/or determining the pace δ is performed at a periodicity which is halved compared to a periodicity in cases where the radiation source is configured to emit the pulses at a single energy mode.

15. The method of claim 1, wherein determining the pace δ is performed in several steps using a plurality K of instants prior to the predetermined instant t, and comprises:

selecting a current predetermined instant t;

generating, using the obtained data, the first image of the cargo for the first column $p_1$ of the matrix detector using the q successive pulses emitted prior to the selected current predetermined instant t;

generating, using the obtained data, the at least one second image of the cargo for the at least one second column $p_2$ of the matrix detector using the q successive pulses emitted prior to the selected current predetermined instant t;

determining, at the current predetermined instant t, a current pace δ using the first image of the cargo, the at least one second image of the cargo at the current predetermined instant t, and the number $(p_2 - p_1)$ corresponding to the number of columns between the first column $p_1$ and the at least one second column $p_2$;

determining whether the determined pace δ is reliable;

if it is determined that the pace δ is reliable, storing the determined current pace δ at the current predetermined instant t;

repeating, for the plurality K of instants:

generating the first image and the at least one second image using the q successive pulses emitted prior to each of the plurality of current instant t, determining the current pace δ, determining whether the current pace δ is reliable, and storing the reliable pace δ; and determining the pace δ at the predetermined instant t by averaging the plurality of stored paces.

16. The method of the claim 1, wherein the q pulses of an instant t overlap the q pulses of an instant t−1, or wherein the q pulses of an instant t do not overlap the q pulses of an instant t−1, and wherein the plurality K of instants is such that:

$$2 \leq K \leq 10.$$

17. The method of claim 1, wherein outputting the data comprises outputting command data to trigger the radiation source at the updated frequency; or further comprising performing the scanning.

18. A controller configured to cooperate with an inspection system for inspecting cargo, the inspection system comprising:

a radiation source configured to emit a plurality N of successive pulses irradiating the cargo at a frequency, and a matrix detector comprising a first column $p_1$ of detectors and at least one second column $p_2$ of detectors, the controller being configured to:

obtain data associated with a scanning of at least one part of the cargo with a current frequency $f_n$, wherein the scanning comprises displacing the cargo and the system with a relative scanning displacement;

determine a pace δ, at a predetermined instant t, comprising:

selecting a number q;

generating, using the obtained data, a first image of the cargo for the first column $p_1$ of the matrix detector using the q successive pulses emitted prior to the predetermined instant t;

generating, using the obtained data, at least one second image of the cargo for the at least one second column $p_2$ of the matrix detector using the q successive pulses emitted prior to the predetermined instant t; and determining, at the predetermined instant t, the pace δ using the first image of the cargo, the at least one second image of the cargo and a number ($p_2-p_1$) corresponding to the number of columns between the first column $p_1$ and the at least one second column; and determine whether the determined pace δ is reliable;

if it is determined that the pace δ is reliable, update the current frequency $f_n$ to an updated frequency $f_n+1$, such that:

$$f_{n+1} = F\left(\frac{\delta_0}{\delta}\right)f_n$$

where F(X) is an increasing function of X such that F(1)=1, and $\delta_0$ is a predetermined pace; and output data to cause the scanning to be performed with the updated frequency being the current frequency.

19. The controller of claim 18, comprising:

an interface board configured to cooperate with the radiation source and/or front end electronics of the matrix detector; and a processor configured to pre-process the data associated with the scanning and/or generate the first image and the at least one second image.

20. The controller of claim 19, wherein the interface board is configured to, for each pulse of the plurality N of successive pulses:

transfer the obtained data to the processor; and/or control acquisition of data by the front end electronics, based on the current frequency $f_n$; and/or control generation of the successive pulses by the radiation source, based on the current frequency $f_n$.

* * * * *